(12) United States Patent
Baer

(10) Patent No.: US 7,348,822 B2
(45) Date of Patent: Mar. 25, 2008

(54) PRECISELY ADJUSTING A LOCAL CLOCK

(75) Inventor: Richard L. Baer, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/342,990

(22) Filed: Jan. 30, 2006

(65) Prior Publication Data

US 2007/0176648 A1  Aug. 2, 2007

(51) Int. Cl.
    *G06F 1/04* (2006.01)
(52) U.S. Cl. ........................... 327/291; 327/113
(58) Field of Classification Search ............... None
    See application file for complete search history.

(56) References Cited

U.S. PATENT DOCUMENTS

| | | | |
|---|---|---|---|
| 4,408,897 A | 10/1983 | Mutrux | |
| 5,132,540 A * | 7/1992 | Adolph et al. | 250/369 |
| 5,422,863 A | 6/1995 | Minowa et al. | |
| 6,452,541 B1 * | 9/2002 | Zhao et al. | 342/357.06 |
| 6,529,485 B1 * | 3/2003 | Agarwal et al. | 370/324 |
| 7,114,091 B2 * | 9/2006 | Vrancic | 713/400 |

OTHER PUBLICATIONS

UK Intellectual Property Office, Patents Act 1977: Search Report under Section 17, Jun. 28, 2007.

* cited by examiner

*Primary Examiner*—Cassandra Cox

(57) ABSTRACT

Accurate correction of a local clock that avoids excessive drift in the local clock while avoiding an accumulation of quantization errors. A local clock according to the present techniques generates a local time by accumulating a sequence of rate coefficients selected from a plurality of rate coefficients using a series of progressively longer replacement periods.

19 Claims, 1 Drawing Sheet

PRECISELY ADJUSTING A LOCAL CLOCK

BACKGROUND

A wide variety of electronic systems may include a local clock. Examples of devices that may include a local clock are numerous and include computer systems, servers, storage devices, test instruments, industrial control devices, environmental control devices, and appliances.

A local clock may include a counter and an oscillator that generates an oscillator signal that causes the counter to increment its count. For example, an oscillator signal having a frequency of one megahertz may cause a counter to increment its count every microsecond, i.e. to count microseconds. Higher frequency oscillators may be used to provide higher time resolutions.

A local time may be associated with a counter by incrementing the counter with a value other than one. For example an oscillator having a frequency of 250 kHz may be used to increment a counter by four every four microseconds in order to maintain a time count in microseconds. A value by which a counter is incremented depends on the rate of its oscillator compared to a time increment to be counted.

The frequency of an oscillator in a local clock may change over time. For example, the frequency of an oscillator may change in response to changes in temperature or other environmental factors. Changes to the frequency of an oscillator may cause a local clock to run faster at some times and slower at other times, thereby decreasing its accuracy.

One prior technique for improving the accuracy of a local clock is to periodically apply a correction. For example, a correction may be added to or subtracted from a local clock to bring it into agreement with a reference time. Unfortunately, applying a correction to a local clock leaves the local clock free to later drift out of agreement with the reference time. Corrections may be frequently applied to a local clock but at the risk of accumulating excessive quantization errors. For example, a local clock that holds an n bit value has a possible quantization error of 1/n during each addition or subtraction of a correction.

SUMMARY OF THE INVENTION

Accurate correction of a local clock is disclosed that avoids excessive drift in the local clock while avoiding an accumulation of quantization errors. A local clock according to the present techniques generates a local time by accumulating a sequence of rate coefficients selected from a plurality of rate coefficients using a series of progressively longer replacement periods.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
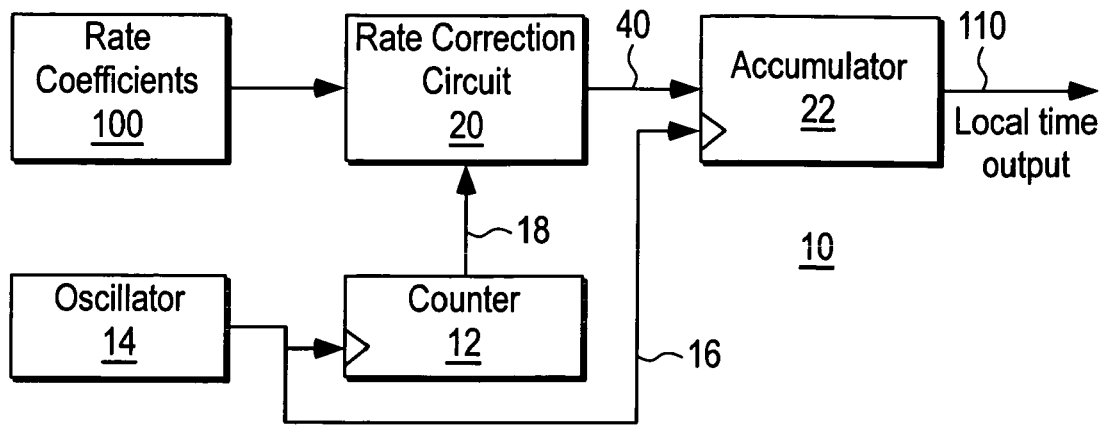
FIG. 1 shows a local clock according to the present teachings.

FIG. 1 shows a local clock 10 according to the present teachings. The local clock 10 includes a counter 12 that generates a time count 18 in response to an oscillator signal 16 from an oscillator 14. The oscillator signal 16 causes the counter 12 to increment, e.g. on rising edges of the oscillator signal 16. The local clock 10 includes a rate correction circuit 20 and an accumulator 22 that generate a local time 110 by accumulating a set of rate coefficients 100 in response to the time count 18. The rate correction circuit 20 selects a sequence of rate coefficients 100 using a series of progressively longer replacement periods.

The rate coefficients 100 may be referred to as $A_0$, $A_1, \ldots A_M$. The rate correction circuit 20 selects a coefficient 40 from among the rate coefficients $A_0$, $A_1, \ldots A_M$ for accumulation by the accumulator 22 for each step in the time count 18.

Table 1 shows the index i of the rate coefficient $A_i$ that is selected by the rate correction circuit 20 this embodiment in the time count 18 in one embodiment. In this embodiment, the rate coefficient $A_1$ replaces every 4th use of the rate coefficient $A_0$. The rate coefficient $A_2$ replaces every 4th use of the rate coefficient $A_1$, and so on.

TABLE 1

| Time Count (hex) | Rate coefficient Index i |
|---|---|
| 1 | 0 |
| 2 | 0 |
| 3 | 0 |
| 4 | 1 |
| 5 | 0 |
| 6 | 0 |
| 7 | 0 |
| 8 | 1 |
| 9 | 0 |
| A | 0 |
| B | 0 |
| C | 1 |
| D | 0 |
| E | 0 |
| F | 0 |
| 10 | 2 |
| 11 | 0 |
| 12 | 0 |
| 13 | 0 |
| 14 | 1 |
| 15 | 0 |
| 16 | 0 |
| 17 | 0 |
| 18 | 1 |
| 19 | |

The allocation of the rate coefficients $A_0, A_1, \ldots A_M$ to the steps in the count 18 provide a set of replacement periods. The replacement periods may be referred to as $N_0, N_1 \ldots N_M$. The replacement periods $N_0, N_1 \ldots N_M$ in one embodiment are multiples of each other such that $N_j = k* N_{j+1}$, for all j where the multiplication factor k is a power of two. In the case of k=4, the local time 110 accumulates as $A_0$, $2*A_0$, $3*A_0$, $(A_1+3*A_0)$, $(A_1+4*A_0)$, $(A_1+5*A_0)$, $(A_1+6*A_0)$ $(2*A_1+6*A_0)$, . . . $(3*A_1+12*A_0)$, $(A_2+3*A_1+12*A_0)$, $(A_2+13*A_0)$ and so on. Each rate coefficient $A_0$, $A_1, \ldots A_M$ has a range of zero to $(2^k-1)$. The rate coefficients $A_0, A_1, \ldots A_M$ and the replacement periods $N_0, N_1 \ldots N_M$ yield an instantaneous quantization error in the local time 110 that does not exceed k/2 times the rate coefficient LSB. Each time the quantization error of the local time 110 approaches k/2 times the rate coefficient LSB, another longer-period rate coefficient is invoked.

In one embodiment, the counter 12 is a binary counter of length log 2(k*M) bits.

Figure 2:
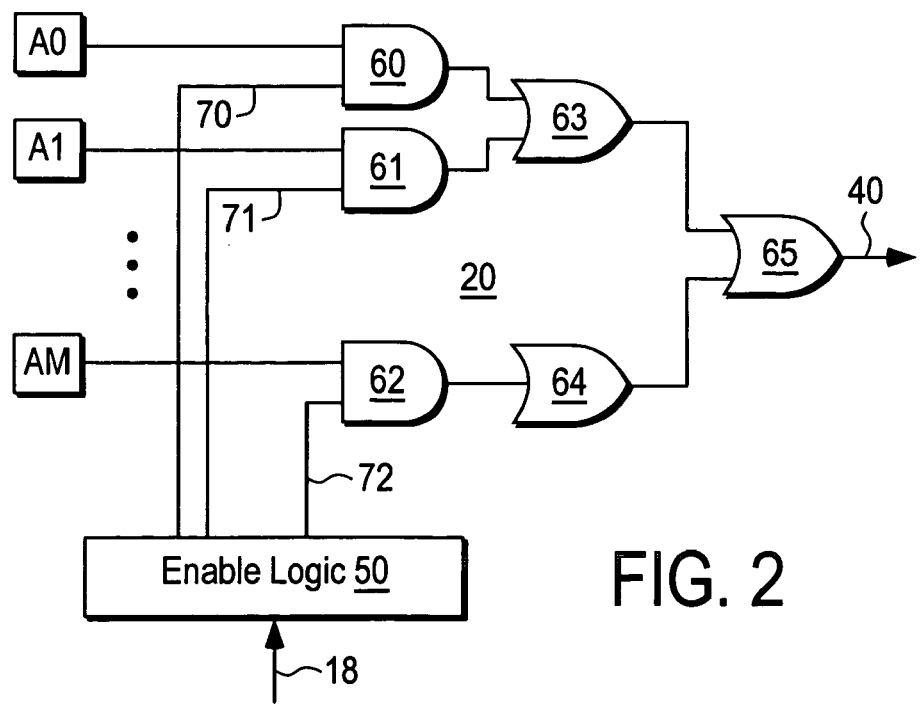
FIG. 2 shows one embodiment of a rate correction circuit according to the present teachings.

FIG. 2 shows one embodiment of the rate correction circuit 20. The rate correction circuit 20 includes a set of AND gates 60-62 and a set of OR gates 63-65 that implement a multiplexor and some enable logic 50 for the multiplexor. The enable logic 50 enables uses the AND gates 60-62 to enable the rate coefficients $A_0, A_1, \ldots A_M$ via a set of enable signals 70-72 (Enable$_0$ through Enable$_M$). The enable logic 50 enables only one of the rate coefficients $A_0, A_1, \ldots A_M$ at each step of the time count 18. The OR gates 63-65 provide the enabled rate coefficient 40 to the accumulator 22.

The enable signals 70-72 are determined by combining bits of the time count 18. The enable signal 70, Enable$_0$, for the 0th rate coefficient is $\sim(\sim x_0 \& \sim x_1 \& \sim x_2 \& \ldots \& \sim x_{k-2} \& x_{k-1})$. The enable signal Enable$_i$ for the ith positive rate coefficient is $(\sim x_0 \& \sim x_1 \& \sim x_2 \& \& \sim x_{p-2} \& x_{p-1}) \& \sim(\sim x_p \& \sim x_{p+1} \& \sim x_{p+2} \& \ldots \& \sim x_{p+k-2} \& x_{p+k-1})$, where $p=i*k$. In this equation, the x's are the bit values of all of the stages of the counter 12. In an embodiment in which $k=4$ and $M=3$, the counter 12 is 12-stage binary counter that derives the enable signals 70-72 for the four rate coefficients $A_0, A_1, A_2$, and $A_3$. The enable signals 70-72 for this embodiment are as follows.

Enable$_0=\sim(\sim x_0 \& \sim x_1 \& \sim x_2 \& x_3)$
Enable$_1=(\sim x_0 \& \sim x_1 \& \sim x_2 \& x_3) \& \sim(\sim x_4 \& \sim x_5 \& \sim x_6 \& x_7)$
Enable$_2=(\sim x_0 \& \sim x_1 \& \sim x_2 \& \sim x_3 \& \sim x_4 \& \sim x_5 \& \sim x_6 \& \sim x_7) \& \sim(\sim x_8 \& \sim x_9 \& \sim x_{10} \& x_{11})$
Enable$_3=(\sim x_0 \& \sim x_1 \& \sim x_2 \& \sim x_3 \& \sim x_4 \& \sim x_5 \& \sim x_6 \& \sim x_7 \& \sim x_8 \& \sim x_9 \& \sim x_{10} \& x_{11})$ The rate correction circuit selects higher index rate coefficients with progressively less frequency. In the example embodiment set forth above, the $A_0$ rate coefficient is used 15 times for every 16 steps of the counter 12. The $A_1$ rate coefficient is used 15 times for every 256 (16*16) steps of the counter 12. The $A_2$ rate coefficient is used 15 times for every 4096 (16*16*16) steps of the counter 12. The $A_3$ rate coefficient is used once every 4096 steps of the counter 12. In an embodiment with an integer number of counter stages and k stages between each rate coefficient and a total of M+1 rate coefficients, the number of times each rate coefficient is applied is $n_i=(k-1)*2^{(k*M)}/2^{(k*(i+1))}$ for $i<M$ and $n_m=1$.

For the example above, the number of times each rate coefficient is selected is as follows.

$n_0=3840$
$n_1=240$
$n_2=15$
$n_3=1$

The local clock 10 improves quantization accuracy over the prior art technique of one correction per correction interval by a factor of k to the M power. The instantaneous accuracy of the local clock 10 is also high because the rate coefficients $A_0, A_1, \ldots A_M$ are applied relatively frequently.

Additional rate coefficients may be used to decrease the value of k and therefore the maximum quantization error, but with an increase in hardware. If the replacement periods $N_0, N_1 \ldots N_M$ are not uniform multiples of each other, then the quantization error is corrected more frequently by some rate coefficients and less frequently by other rate coefficients.

The rate coefficients $A_0, A_1, \ldots A_M$ are selected to yield a final count F. The final count F may be derived from a time offset for correcting the local time 110, e.g. during IEEE 1588 time synchronization. The most frequently used rate coefficient is selected first and then the others are selected in sequence. The rate coefficients $A_0, A_1, \ldots A_M$ are determined as follows.

$A_0=\text{floor}(F/n_0)$
$A_1=\text{floor}((F-A_0*n_0)/n_1)$
$A_2=\text{floor}((F-A_0*n_0-A_1*n_1)/n_2)$
$A_i=\text{floor}((F-A_0*n_1 \ldots -A_{i-1}*n_{i-1})/n_i)$ For the example above, with a final count F equal to 16,793, then the rate coefficients $A_0, A_1, \ldots A_M$ are as follows.

$A_0=4$
$A_1=5$
$A_2=15$
$A_3=8$

Alternative counting schemes may be used in the local clock 10, but at the expense of more complicated rate coefficient selection logic. Counting schemes in which the frequency of rate coefficient use does not decrease geometrically with rate coefficient number will make suboptimal use of the rate coefficients by allowing more error.

The foregoing detailed description of the present invention is provided for the purposes of illustration and is not intended to be exhaustive or to limit the invention to the accurate embodiment disclosed. Accordingly, the scope of the present invention is defined by the appended claims.

What is claimed is:

1. A circuit that adjusts a local time by accumulating a sequence of rate coefficients selected from a plurality of rate coefficients using a series of progressively longer replacement periods.

2. The circuit of claim 1, wherein the replacement periods and the rate coefficients are selected to avoid an accumulation of quantization errors in the local time.

3. The circuit of claim 1, wherein the replacement periods and the rate coefficients are selected to avoid large errors in the local time.

4. The circuit of claim 1, wherein the replacement periods are multiples of one another.

5. The circuit of claim 4, wherein the replacement periods increase geometrically by two to an integer power.

6. The circuit of claim 1, wherein the rate coefficients are derived from a time offset associated with time synchronization.

7. A method for adjusting a local time, comprising:
selecting a sequence of rate coefficients from among a plurality of rate coefficients;
accumulating the sequence of rate coefficients each during a progressively longer replacement period.

8. The method of claim 7, wherein the replacement periods and the rate coefficients are selected to avoid an accumulation of quantization errors in the local time.

9. The method of claim 7, wherein selecting a sequence of rate coefficients comprises selecting a sequence of rate coefficients and the replacement periods to avoid large errors in the local time.

10. The method of claim 7, wherein accumulating the sequence of rate coefficients comprises accumulating the sequence of rate coefficients during a set of replacement periods that are multiples of one another.

11. The method of claim 10, wherein accumulating the sequence of rate coefficients during a set of replacement periods that are multiples of one another comprises accumulating the sequence of rate coefficients during a set of replacement periods that increase geometrically by two to an integer power.

12. The method of claim 7, further comprising deriving the rate coefficients from a time sheet associated with time synchronization.

13. A local clock, comprising:

counter that generates a time count;

rate correction circuit that selects a sequence of rate coefficients from among a plurality of rate coefficients using a series of progressively longer replacement periods;

accumulator that generates a local time by accumulating the sequence of rate coefficients.

14. The local clock of claim 13, wherein the rate correction circuit comprises:

multiplexor that selects from among the rate coefficients in response to a set of enable signals;

enable logic that generates the enable signals in response to the time count using the series of progressively longer replacement periods.

15. The local clock of claim 13, wherein the replacement periods and the rate coefficients are selected to avoid an accumulation of quantization errors in the local time.

16. The local clock of claim 13, wherein the replacement periods and the rate coefficients are selected to avoid large errors in the local time.

17. The local clock of claim 13, wherein the replacement periods are multiples of one another.

18. The local clock of claim 17, wherein the replacement periods increase geometrically by two to an integer power.

19. The local clock of claim 13, wherein the rate coefficients are derived from a time offset associated with time synchronization.

* * * * *

UNITED STATES PATENT AND TRADEMARK OFFICE
CERTIFICATE OF CORRECTION

PATENT NO. : 7,348,822 B2 Page 1 of 1
APPLICATION NO. : 11/342990
DATED : March 25, 2008
INVENTOR(S) : Baer It is certified that error appears in the above-identified patent and that said Letters Patent is hereby corrected as shown below:

In column 4, line 66, in Claim 12, delete "sheet" and insert -- offset --, therefor.

Signed and Sealed this

Fifth Day of August, 2008

JON W. DUDAS
*Director of the United States Patent and Trademark Office*